United States Patent Office 3,080,399
Patented Mar. 5, 1963

3,080,399
CYCLOPENTANOPHENANTHRENE COMPOUNDS
AND PROCESS
Howard J. Ringold and George Rosenkranz, Mexico City,
Mexico, assignors, by mesne assignments, to Syntex
Corporation, a corporation of Panama
No Drawing. Filed July 5, 1957, Ser. No. 669,955
Claims priority, application Mexico July 13, 1956
2 Claims. (Cl. 260—397.5)

The present invention relates to cyclopentanophenantherene compounds and to a method for the production thereof.

More particularly the present invention relates to novel 6-methyl estrone and estradiol derivatives and to a novel process for the production thereof. The novel compounds of the present invention are estrogenic hormones i.e. they show lesser estrogenic activity together with valuable anti-androgenic activity.

In our patent application Serial No. 643,550, filed March 4, 1957, there is disclosed the production of the novel 6α-methyl testosterone. In accordance with the present invention it has been discovered that this compound upon treatment with an oxidizing agent capable of oxidizing the 17-hydroxyl group to a keto group yields the novel intermediate and androgenic hormone 6α-methyl-$\Delta^4$-androsten-3,17-dione. Further this last compound upon treatment with approximately 2 mols of bromine gives the novel intermediate 6-methyl-2,6-dibromo-$\Delta^4$-androsten-3,17-dione which yields the novel 6-methyl-$\Delta^{1,4,6}$-androstadien-3,17-dione upon treatment with a dehydrohalogenating agent. In accordance with the present invention it has further been discovered that this last compound when subjected to pyrolysis aromatizes to form 6-methyl-6-dehydroestrone an estrogenic hormone in intermediate for the production of other novel estrogenic hormones namely 6-methyl-estrone and estradiol derivatives. These are 6-methyl-6-dehydro-estradiol, 6-methyl-17α-ethinyl-6-dehydro-estradiol, 6-methyl-estrone, 6-methyl-estradiol, and 6-methyl-17α-ethinyl-estradiol. From these compounds by conventional means there was also prepared their novel esters of hydrocarbon carboxylic acids of less than 12 carbon atoms.

The novel 6-methyl estrone and estradiol derivatives of the present invention may therefore be exemplified by the following formula:

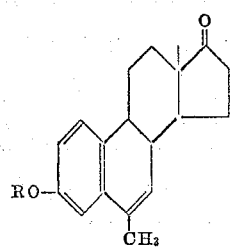

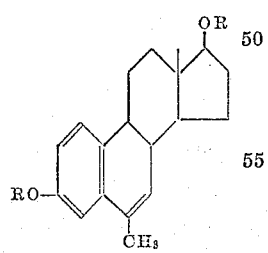

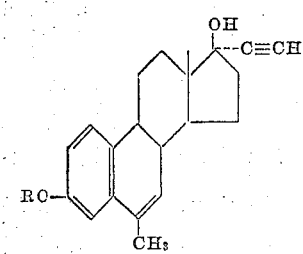

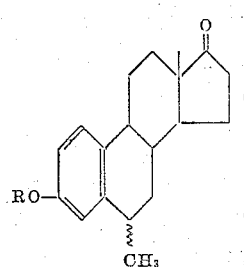

and

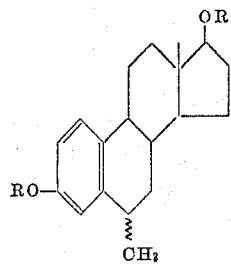

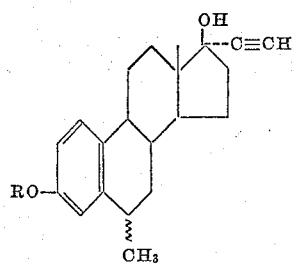

In the above formula R represents an acyl group derived from a hydrocarbon carboxylic acid of less than 12 carbon atoms such as acetic, propionic, caproic, benzoic, cyclopentylpropionic, phenylpropionic, etc. or R may represent hydrogen.

A part of the process of the present invention may be exemplified by the following equation:

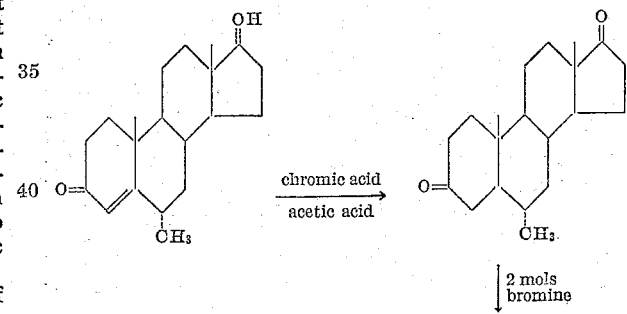

In practicing the process above outlined the 6α-methyl testosterone (6α-methyl-$\Delta^4$-androsten-17β-ol-3-one) is preferably dissolved in glacial acetic acid and the solution cooled below room temperature. Chromic acid (slightly over 1 equivalent) in acetic acid is then added slowly with stirring and while maintaining the reaction mixture below room temperature. The reaction mixture is then allowed to stand for a period of the order of 2 hours at room temperature, poured into ice water and the precipitate of 6α-methyl-$\Delta^4$-androsten-3,17-dione was collected and purified as by crystallization from an alcoholic solvent. For the next step of the process outlined above the product of the first step was suspended in an organic solvent such as ether to which a catalytic amount of hydrogen bromide in acetic acid was added. To this suspension there was slowly added slightly over 2 mols of bromine in acetic acid. The resulting clear solution was then allowed to stand for one hour and then concentrated under reduced pressure until crystallization of the 2,6-dibromo-6α-methyl-Δ⁴ - androsten - 3,17 - dione. The crystals were then filtered and washed with a small amount of ether.

As indicated in the equation the 2,6-dibromo compound upon treatment with a dehydrohalogenating agent gave as a product 6-methyl-Δ¹,⁴,⁶-androstatrien-3,17-dione. As a suitable dehydrohalogenating agent a tertiary amine such as collidine under reflux was used. Preferably the dibromo compound was refluxed with the collidine for a short period of the order of 1 hour and then cooled. The product was separated from the collidine hydrobromide and purified to give 6-methyl-Δ¹,⁴,⁶-androstatrien-3,17-dione.

Another part of the process of the present invention may be exemplified by the following equation:

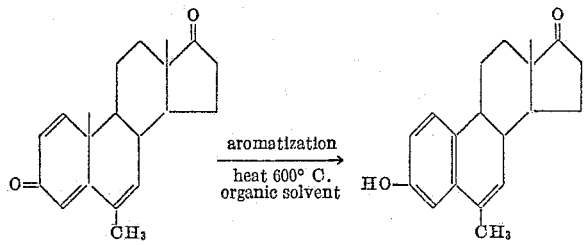

In practicing the process above outlined the reaction is preferably performed by passing a dilute solution as for example 1-2% by weight of the 6-methyl-Δ¹,⁴,⁶-androstatrien-3,17-dione, through a tube or column filled with glass helices and heated to a temperature as for example of 600° C. and preferably between 500° and 650° C. The solvents used are preferably hydrogen donar solvents such as tetralin, mineral oil, dihydronaphthalene, dihydrophenanthrene, cyclohexane etc. After passage through the tube the hot reaction solution was diluted with an organic solvent such as hexane and the product (6-methyl-6-dehydroestrone) purified as by chromatography and crystallization. From the free compound by conventional acylation procedures such as reaction with the corresponding acid anhydrides or acyl halides there were then prepared esters of hydrocarbon carboxylic acids of less than 12 carbon atoms such as those previously set forth.

The 6-methyl-6-dehydro-estrone was utilized for the preparation of 6-methyl-6-dehydro-estradiol and 6-methyl-17α-ethinyl-6-dehydro-estrodiol in accordance with the following equation:

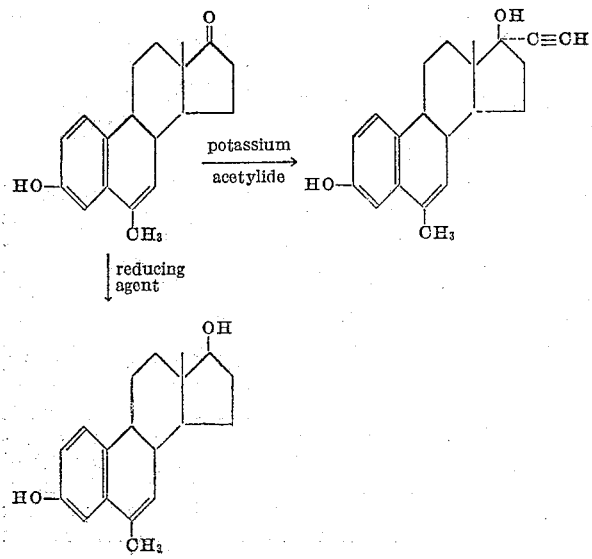

To prepare the ethinyl derivative as indicated above the 17-keto compound is reacted with potassium acetylide prepared in situ. Thus the 6-methyl-6-dehydro-estrone may be dissolved in an organic solvent, such as benzene, and added to a solution of potassium metal in a tertiary alcohol such as t-butyl alcohol. Acetylene is then passed into the reaction mixture for a prolonged period of time of the order of 2 days. Neutralization with acid and removal of the organic solvents by steam distillation resulted in a precipitate of the 17α-ethinyl product which was purified as by crystallization.

For the production of the estradiol derivative the estrone compound was treated with a reducing agent preferably an alkali metal hydride such as sodium borohydride or lithium aluminum hydride in alcohol-water solution.

Similarly with prior hydrogenation the 6-methyl-6-dehydro-estrone can be utilized for the preparation of 6-methyl-estrone, 6-methyl-estradiol and 6-methyl-17α-ethinyl-estradiol in accordance with the following equation.

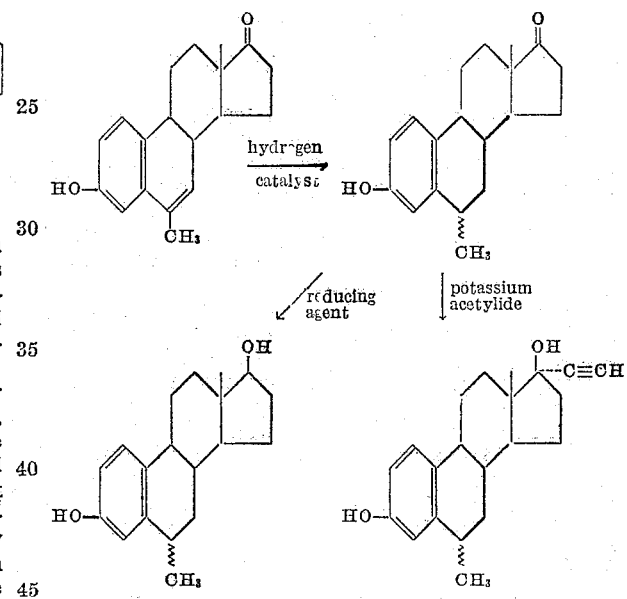

As indicated above upon hydrogenation in the presence of a hydrogenation catalyst preferably palladium or platinum until 1 mol of hydrogen was taken up gave the corresponding 6-methyl-estrone. Reaction with a reducing agent or with potassium acetylide as previously described in connection with the 6-dehydro compounds gave the corresponding 6-methyl estradiol and 6-methyl-17α-ethinylestradiol derivatives.

It may be noted further that all of the non-tertiary alcohol groups in both the 6 dehydro and corresponding 6-saturated compounds previously described may be conventionally esterified as with acid anhydrides or acyl halides to give either mono or diesters as previously indicated.

The following specific examples serve to illustrate but are not intended to limit the present invention.

*Example 1*

A solution of 710 mg. (1.1 equivalents) of chromic acid in 15 cc. of 80% acetic acid dropwise to a stirred solution of 3.0 g. of 6α-methyl-Δ⁴-androsten-17β-ol-3-one in 30 cc. of glacial acetic acid, while the temperature was maintained below 20° C. After 2 hours standing at room temperature the mixture was poured into ice water and the precipitate was collected, well washed with water and crystallized from methanol, thus giving 6α-methyl-Δ⁴-androsten-3,17-dione.

A suspension of 2.5 g. of the above compound in 50 cc. of ether containing 3 drops of a saturated solution of hydrogen bromide in acetic acid, was slowly treated with a solution of 2.8 g. (2.1 mols) of bromine in 30 cc. of acetic acid. The resulting clear solution was kept standing for 1 hour and then concentrated under reduced pressure until crystallization. The 2,6-dibromo-6-methyl-$\Delta^4$-androsten-3,17-dione produced was filtered and washed with a little ether.

3.0 g. of the 2,6-dibromo derivative was refluxed for 1 hour with 10 cc. of collidine and then cooled. The precipitate of collidine hydrobromide was filtered and well washed with ether and the solution was washed with dilute hydrochloric acid, with sodium bicarbonate and water, dried and evaporated to dryness. Chromatography of the residue with 100 g. of alumina afforded the pure 6-methyl-$\Delta^{1,4,6}$-androstatrien-3,17-dione.

*Example II*

A solution of 2.0 g. of 6-methyl-$\Delta^{1,4,6}$-androstatrien-3,17-dione in 200 cc. of mineral oil was passed through a column packed with glass helices previously heated to 600°, and this temperature was maintained during the operation. The solution was diluted with hexane and passed through a chromatographic column with 300 g. of alumina. The column was well washed with hexane to completely remove the mineral oil and then it was eluted with ether. The crystalline fractions were combined and crystallized from methanol to give 6-methyl-6-dehydro-estrone.

Conventional reaction of this compound with acid anhydrides and/or chlorides gave the corresponding 3-propionate, 3-benzoate, 3-cyclopentylpropionate and the 3-phenylpropionate.

*Example III*

0.3 g. of 6-methyl-6-dehydro-estrone, dissolved in 20 cc. of methanol, was treated with a solution of 0.2 g. of sodium borohydride in 3 cc. of water and kept for 3 hours at room temperature. A few drops of acetic acid was then added and the solution was diluted with salt water. The precipitate was collected, washed with water and crystallized from acetone-hexane, thus giving 6-methyl-6-dehydro-estradiol.

Conventional reaction of this compound with acid anhydrides and/or chlorides gave the corresponding 3,17-dipropionate, 3,17-dibenzoate, 3,17-cyclopentylpropionate and the 3,17-diphenylpropionate.

*Example IV*

A solution of 0.5 g. of 6-methyl-6-dehydro-estrone in 20 cc. of anhydrous benzene was added under an atmosphere of nitrogen to a cooled solution of 0.5 g. of potassium metal in 25 cc. of t-butyl alcohol, which had also been prepared under a stream of nitrogen. The stream of nitrogen was then substituted by a stream of dry, purified acetylene and the operation was continued for 40 hours. The solution was poured into 100 cc. of dilute hydrochloric acid, the organic solvents were removed by steam distillation, the mixture was cooled and the precipitate was collected. Crystallization from chloroform-methanol yielded 6-methyl-17$\alpha$-ethinyl-6-dehydro-estradiol.

Conventional reaction of this compound with acid anhydrides and/or chlorides gave the corresponding 3-propionate, 3-benzoate, 3-cyclopentylpropionate and the 3-phenylpropionate.

*Example V*

A solution of 0.5 g. of 6-methyl-6-dehydro-estrone in 25 cc. of ethyl acetate was stirred under an atmosphere of hydrogen, at room temperature and atmospheric pressure, in the presence of 100 mg. of a 10% palladium on charcoal catalyst. After the equivalent of one mol of hydrogen had been absorbed, the solution was filtered and evaporated to dryness. Crystallization from acetone-hexane afforded 6-methyl-estrone.

Conventional reaction of this compound with acid anhydrides and/or chlorides gave the corresponding 3-propionate, 3-benzoate, 3-cyclopentylpropionate and the 3-phenylpropionate.

0.3 g. of 6-methyl-estrone dissolved in 20 cc. of methanol was treated with a solution of sodium borohydride, as described in Example III, thus affording 6-methyl-estradiol.

Conventional reaction of this compound with acid anhydrides and/or chlorides gave the corresponding 3,17-dipropionate, 3,17-dibenzoate, 3,17-cyclopentylpropionate and the 3,17-diphenylpropionate.

*Example VI*

The reaction of 6-methyl-estrone with potassium t-butylate and acetylene, in accordance with the conditions described in Example IV, produced 6-methyl-17$\alpha$-ethinyl-estradiol.

Conventional reaction of this compound with acid anhydrides and/or chlorides gave the corresponding 3-propionate, 3-benzoate, 3-cyclopentylpropionate and the 3-phenylpropionate.

We claim:
1. 6-methyl-17$\alpha$-ethinyl-6-dehydro-estradiol.
2. The hydrocarbon carboxylic esters of less than 12 carbon atoms of 6-methyl-17$\alpha$-ethinyl-6-dehydro-estradiol.

References Cited in the file of this patent

UNITED STATES PATENTS

| | | |
|---|---|---|
| 2,598,652 | Velluz et al. | May 27, 1952 |
| 2,671,092 | Djerassi | Mar. 2, 1954 |
| 2,705,237 | Djerassi et al. | Mar. 29, 1955 |
| 2,705,239 | Huffman | Mar. 29, 1955 |
| 2,723,280 | Inhoffen | Nov. 8, 1955 |
| 2,857,403 | Fried et al. | Oct. 21, 1958 |
| 2,880,205 | Campbell et al. | Mar. 31, 1959 |
| 2,904,564 | Tristram | Sept. 15, 1959 |

OTHER REFERENCES

Bush: Experientia, vol. 12, Fasc. 9, page 325 (1956).